(12) United States Patent
Rouzes (10) Patent No.: US 8,427,537 B2
(45) Date of Patent: Apr. 23, 2013

(54) OPTICAL METHOD AND DEVICE FOR DETECTING THE MOVEMENTS OF A SOLID IN SPACE

(75) Inventor: Siegfried Rouzes, Le Haillan (FR)

(73) Assignee: Thales, Neuilly sur Seine (FR)

( * ) Notice: Subject to any disclaimer, the term of this patent is extended or adjusted under 35 U.S.C. 154(b) by 433 days.

(21) Appl. No.: 12/770,930

(22) Filed: Apr. 30, 2010

(65) Prior Publication Data

US 2010/0277583 A1  Nov. 4, 2010

(30) Foreign Application Priority Data

Apr. 30, 2009  (FR) ...................... 09 02121

(51) Int. Cl.
*H04N 7/18* (2006.01)

(52) U.S. Cl.
USPC ........................................................ 348/140

(58) Field of Classification Search .................. 348/140, 348/744, E9.025, 135, 144, 117; 382/103, 382/154; 356/614, 615
See application file for complete search history.

(56) References Cited

U.S. PATENT DOCUMENTS

| 4,672,564 | A | * | 6/1987 | Egli et al. ...................... 702/153 |
| 5,227,985 | A | | 7/1993 | Dementhon |
| 5,729,475 | A | * | 3/1998 | Romanik, Jr. ................. 702/150 |
| 5,828,770 | A | * | 10/1998 | Leis et al. ...................... 382/103 |
| 5,856,844 | A | * | 1/1999 | Batterman et al. ....... 348/207.99 |
| 6,973,202 | B2 | * | 12/2005 | Mostafavi ..................... 382/103 |
| 7,184,151 | B2 | * | 2/2007 | Clarke et al. .................. 356/620 |
| 7,289,227 | B2 | * | 10/2007 | Smetak et al. ................. 356/614 |
| 2003/0063292 | A1 | * | 4/2003 | Mostafavi ..................... 356/614 |
| 2005/0213109 | A1 | * | 9/2005 | Schell et al. .................. 356/614 |
| 2007/0081695 | A1 | | 4/2007 | Foxlin et al. |
| 2010/0020335 | A1 | | 1/2010 | Rouzes |
| 2010/0079830 | A1 | * | 4/2010 | Lacoste et al. ..................... 359/9 |
| 2010/0085581 | A1 | | 4/2010 | Barbier et al. |
| 2010/0098325 | A1 | | 4/2010 | Barbier et al. |
| 2010/0110176 | A1 | * | 5/2010 | Aoyama ........................ 348/135 |
| 2010/0277583 | A1 | * | 11/2010 | Rouzes .......................... 348/140 |

FOREIGN PATENT DOCUMENTS

EP  1 415 609 A1  5/2004
FR  2 905 455 A1  3/2008

OTHER PUBLICATIONS

Jay B. West, et al., "Designing Optically Tracked Instruments for Image-Guided Surgery", IEEE Transactions on Medical Imaging, May 1, 2004, pp. 533-545, vol. 23, No. 5, IEEE Service Center, Piscataway, NJ, US, XP011112019.

* cited by examiner

*Primary Examiner* — Mehrdad Dastouri
*Assistant Examiner* — Jared Walker
(74) *Attorney, Agent, or Firm* — Baker & Hostetler LLP (57) ABSTRACT

The optical method for detecting the orientation of an object in space, the object including a triple of notable and aligned points tied to the said object, whose relative positions are known, the three points defining a first straight line in space, optical detection means making it possible to determine the relative positions in its image plane of the projections of notable points in space, a computer making it possible, by means of the relative positions of the projections in the image plane of the three notable points, and of an identifiable characteristic of an external one of the points of the triples of points, to determine a direction vector of the straight line and of its orientation.

14 Claims, 6 Drawing Sheets

OPTICAL METHOD AND DEVICE FOR DETECTING THE MOVEMENTS OF A SOLID IN SPACE

CROSS-REFERENCE TO RELATED APPLICATIONS

This application claims priority to foreign France patent application No. 0902121, filed on Apr. 30, 2009, the disclosure of which is hereby incorporated by reference in its entirety.

FIELD OF THE INVENTION

The present invention relates to the field of methods of optical detection of the orientation of an object in space, notably when the orientation of the object is determined by an oriented direction of a sight line.

The invention also relates to the field of methods of optical detection of position, rotation and translation of an object moving in space. It applies more particularly in the aeronautical field. In a particular application of the invention, the detected object is a pilot helmet.

BACKGROUND OF THE INVENTION

The determination of the positioning of a point in space and the determination of the attitude of an arbitrary object are problems relating to numerous technical fields.

The various solutions generally afforded must resolve any ambiguity in position or attitude, cater for more or less severe dynamics in terms of swing, speeds and accelerations of the systems and satisfy high accuracy, in particular in the aeronautical field.

In systems for detecting position and attitude of objects in space catering for an accuracy of a few millimeters in position and for a degree in attitude, numerous applications exist in various fields.

These systems are used in aeronautics, for the detection of head posture, notably for the helmets for fighter aircraft, for military, civilian or para-civilian helicopters. The latter case of para-civilian application may involve rescue missions at sea for example. They are also used for the detection of simulation helmets, this detection can then be combined with an oculometry device, also called an eyetracker, for detecting the position of the gaze. Numerous applications of these systems also exist in the field of virtual reality and games.

More generally, numerous applications also exist in the field of generic posture detection, notably in the medical field for remote operations and the monitoring of instruments, in the field of position command for slaved machine tools or of remote control and finally for cinema, so as to reproduce movements in synthesis images.

These various applications have technical solutions catering for more or less constraining requirements.

Concerning applications with weak constraints, notably in terms of accuracies, there exist various systems for detecting position and/or orientation of objects.

For example, camera-based devices that recognize patches or shapes use designs printed on an object. Several cameras observe the scene and determine the spatial configuration of the observed design.

There also exist camera-based devices that recognize spheres, which are used, for example in cinema, to reconstruct human movement. The device uses several cameras which observe reflecting spheres and determine their trajectory.

Finally there exist ultrasound positioning devices relying on the principle of triangulation between ultrasonic emitters and receivers.

Concerning higher-performance applications, in particular in the aeronautical field, devices for detecting posture of helmets in aircraft use two principal techniques, namely electromagnetic posture detection and electro-optical posture detection.

Electromagnetic posture detection requires devices comprising means for emitting an electromagnetic field and reception sensors on the helmet making it possible to determine their position with respect to the emitter.

Electro-optical posture detection generally requires patterns of electroluminescent diodes, also called LEDs, disposed on the helmet and several sensors of camera type mounted in the cockpit making it possible to determine the spatial configuration of a pattern of LEDs.

These devices often require several cameras and several sensors. Generally, the computations are complex and the slaving of the detection of the movement of an object requires significant computational resources. This complexity is related to the spatial geometry due to disposition of the sensors on the object and/or large amplitudes of the attitude of the object as well as the swiftness of the movement. The position computations then demand numerous resources and the real time analysis is complex to implement.

To improve performance, other devices comprising sensors of gyroscopic, accelerometric or magnetometric types are frequently combined. This hybridization of sensors makes it possible to improve dynamic performance or to resolve an orientation ambiguity. Nonetheless, the hybridization of the systems adds complexity and bulk.

These solutions therefore exhibit a certain number of drawbacks and limitations, particularly in the aeronautical field.

As regards electromagnetic posture detection devices, robust solutions are difficult to implement.

In particular, in the aeronautical field, stray radiations and electromagnetic disturbances may degrade the performance of the existing systems.

A solution implementing a device of electro-optical type such as described in patent FR 2 905 455 makes it possible to circumvent the drawbacks of the electromagnetic devices.

Moreover, this solution preferably uses image projection means of the video-projector type.

In particular, monochromatic laser video-projectors have the advantages of emitting in a very narrow band of frequencies, a sharp image in a wide field and of making it possible to concentrate a high energy in a very small zone.

A solution of this type is also detailed in the French patent filed under the number 08 05315 on 26 Sep. 2008, in which is described a system for projecting sighting marks onto photosensitive sensors reducing the computations required for detecting the posture of an object in space.

On the other hand this solution exhibits drawbacks of bulkiness, implementation and the stray lights, such as that of the sun illuminating the sensors situated on the moving object may induce detection errors.

More precisely, this solution comprises electro-optical sensors disposed on the object and distributed group-wise.

A drawback of such sensors is the constraint of accuracy of mechanical transfer of the sensors onto their support. Indeed, one typically seeks to obtain accuracies of the order of a milliradian in orientation on linear sensors of a length of the order of 3 cm. This imposes a transfer accuracy of the order 30 μm which must be maintained under all temperature conditions, inter alia. If the sensor is in a plane and possesses a parallelepipedal shape, it must be potentially transferred onto ceramic and necessitates a very specific manufacturing process.

Moreover, this disposition contributes to the compounding of errors of mechanical tolerancing, for example in the positioning of the sensor on the helmet and as regards the accuracy of the sensor. The latter solution requires accurate calibration of the sensor, which may involve the storage of correction coefficients at sensor level so as to be able to attain the desired accuracy level.

SUMMARY OF THE INVENTION

The invention makes it possible to alleviate the aforesaid drawbacks. The invention makes it possible to determine the orientation of a solid in space on the basis of optical detection means, such as a camera for example, on the basis of a minimum of identifiable points when the latter are positioned in a simple configuration. They are notably aligned and tied to the solid.

The method according to the invention makes it possible to consider at least three identifiable points on the solid defining a straight line so as to compute the orientation of the straight line.

When the solid comprises two pairs of triples of points identifiable by the optical detection means, the invention makes it possible to ascertain the rotation performed by the solid between two instants when the latter is moving.

Furthermore, when the position of one of the points of the pair of triples of points is known, the invention makes it possible to determine the translation performed by the solid between two instants when the latter is moving.

Advantageously, the optical method for detecting the orientation of an object in space, the object comprising a first triple of notable and aligned points tied to the said object, whose relative positions are known, the three points defining a first straight line in space, optical detection means making it possible to determine the relative positions in its image plane (I) of the projections of notable points in space, is characterized in that a computer makes it possible, by means of the relative positions of the projections in the image plane of the three notable points, and of an identifiable characteristic of an extremal one of the points of the triples of points, to determine a direction vector of the straight line and of its orientation.

Advantageously, the direction vector of the straight line is plotted by the vector $\overrightarrow{OE}$, where O is the centre of a reference frame $R(O, \vec{u}, \vec{v}, \vec{w})$ having as origin a point belonging to the optical detection means, $\vec{u}$ being parallel to the optical axis of the optical detection means, and the planes $(\vec{v}, \vec{w})$ being parallel to the image plane (I), where E is the point of the image plane defined by the relation:

$$\overrightarrow{P_1 E} = \frac{K}{K-T}\overrightarrow{P_1 P_2},$$

with $P_1$, $P_2$ and $P_3$ the three projections in the image plane of the points $M_1$, $M_2$, $M_3$, and $$K = \frac{M_2 M_3}{M_1 M_3} \text{ and } T = \frac{P_2 P_3}{P_1 P_3}.$$

Advantageously, the notable points are diodes, one of the extremal diodes of which has a different luminescence from the other two diodes.

Advantageously, the extremal diode diffuses a light whose wavelength is different from the other two.

Advantageously, the extremal diode diffuses a light whose luminous intensity is different from the other two.

Advantageously, one of the notable points is situated at an end or at the centre of a geometric shape identifiable by the optical detection means.

Advantageously, each notable point is situated at an end or at the centre of an identifiable geometric shape whose shapes are solid, and for which the identifiable characteristic of an extremal point is that the shape with which the point is associated is of a different colour from the other two shapes.

Advantageously, the identifiable geometric shapes are rectangles.

Advantageously, the extremal point comprising an identifiable characteristic is at the centre of a cross identifiable by the optical detection means.

Advantageously, the optical detection means are a camera.

Advantageously, the optical method for detecting the orientation and rotation of an object in space, the object comprising a second triple of notable and aligned points tied to the said object, whose relative positions are known, the three points defining a second straight line in space not parallel to the first straight line, optical detection means making it possible to determine the relative positions in its image plane (PI) of the projections of notable points in space, is characterized in that a computer makes it possible, by means of the relative positions of the projections in the image plane of the two pairs of triples of notable points, and of an identifiable characteristic of an extremal one of the points of the triples of points, to determine the characteristic of the rotation of the said object.

Advantageously, the rotation r of the object is defined by the matrix relation:

$$r = [\vec{e}; \vec{e'}; \vec{u}] \cdot [\vec{e_0}; \vec{e'_0}; \vec{u_0}]^{-1}, \text{ or } \vec{u} = \vec{e} \wedge \vec{e'}.$$

with:

$e_0$ and $e_0'$: the vectors defining, at an instant $t_0$, the direction of each of the straight lines d and d', and;

e and e': the vectors defining, at an instant t, the direction of each of the straight lines d and d';

E' is the point of the image plane defined by the relation:

$$\overrightarrow{P_1' E'} = \frac{K}{K-T}\overrightarrow{P_1' P_2'},$$

with $P_1'$, $P_2'$ and $P_3'$ the three projections in the image plane of the points $M_1'$, $M_2'$, $M_3'$, and $$K = \frac{M_2' M_3'}{M_1' M_3'} \text{ and } T = \frac{P_2' P_3'}{P_1' P_3'}.$$

Advantageously, a parameter kT makes it possible at each instant to define the translation t of the object, the translation t being expressed thus: $\vec{t} = k_T \overrightarrow{OP_1} - r(\overrightarrow{OM_1^0})$, where $M_1^0$ is a known position of the point $M_1$ at a given instant.

Advantageously, the parameter kT satisfies the equality:

$$k_T = \frac{T}{|K-T|} \frac{M_1 M_2}{OE}.$$

Advantageously, the optical device for detecting the orientation and rotation of an object in space implements the method of the invention. It comprises a camera, a computer and means of signalling comprising the definition of two pairs of triples of notable points. It is characterized in that the computer, computing the rotation and the translation of the object in space, mechanically slaves the orientation of the optical axis of the camera according to the position of the object in space.

BRIEF DESCRIPTION OF THE DRAWINGS

Other characteristics and advantages of the invention will become apparent with the aid of the description which follows, given with regard to the appended drawings which represent.

MORE DETAILED DESCRIPTION

Figure 1:
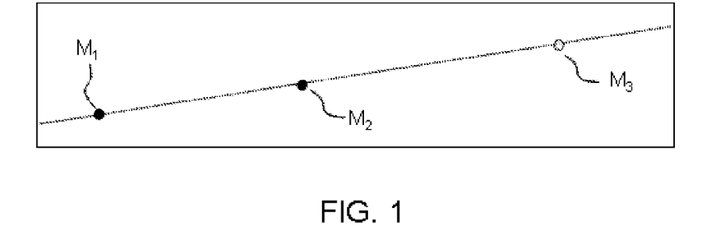
FIG. 1: an exemplary straight line defined by three notable points of an object.

FIG. 1 represents three points $M_1$, $M_2$, $M_3$ aligned and tied to a solid, the solid not being represented. The three points form a first straight line. In one embodiment an extremal one of the points is identifiable on the image plane of the optical detection means.

In one case of realization the optical detection means are a camera. The notable points $M_1$, $M_2$, $M_3$ may be realized by means of diodes for example. One of the extremal diodes, $M_3$ for example, may be differentiated from the two other diodes by the wavelength of the light beams diffused for example.

In the example of FIG. 1 two diodes $M_1$ and $M_2$ are white in colour and the diode $M_3$ is blue in colour. This solution makes it possible not only to retrieve, on the basis of the projections of the points in the image plane, the direction of the straight line formed by the points tied to the object but also its orientation.

Figure 2A:
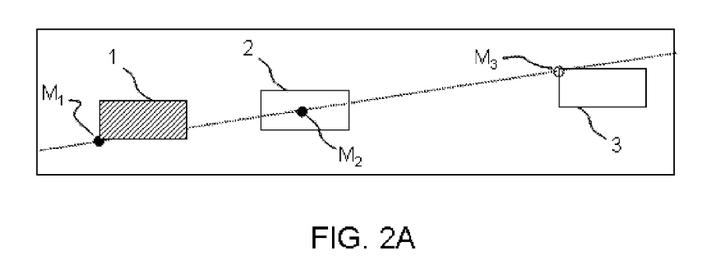
FIG. 2A: an example of a first straight line defined by three notable points of elements tied to an object.

FIG. 2A represents an embodiment where the points $M_1$, $M_2$ and $M_3$ are virtual. They each correspond to a particular point of a shape identifiable by the optical detection means. Their position can be retrieved on the basis of the knowledge of their position on a geometric shape identifiable by the camera.

In order to be identifiable, the geometric shape according to the embodiments can be solid and of a notable colour or it may be luminous.

In a particular case, the shape can correspond to a black hole, either through a black colour or through the formation of a cavity in the volume of the object to which it is tied.

In the example of FIG. 2A, three solid shapes 1, 2, 3, each having an identifiable colour, are visible and detectable by the camera. The points $M_1$, $M_2$ and $M_3$ chosen correspond to ends of the geometric shapes or to their centre. The disposition of the geometric shapes on the object is such that the three points are aligned.

The point $M_1$ is situated at an end of a first rectangle 1, the point $M_2$ is situated in the middle of a second rectangle 2 and finally the point $M_3$ is situated at an end of a third rectangle 3.

The advantage of such a solution is to employ larger detectable surfaces while being able to geometrically reconstruct the straight line making it possible to compute the orientation of an object tied to identifiable geometric shapes.

Figure 2B:
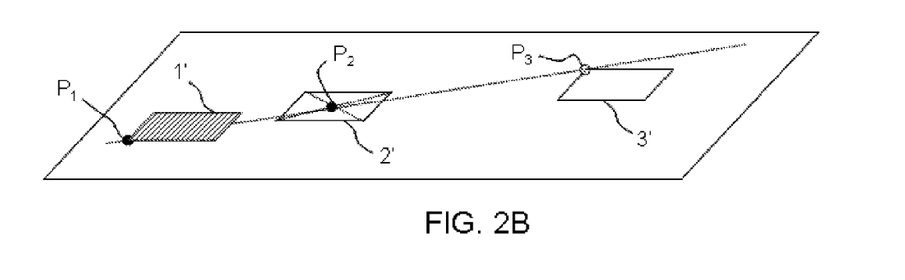
FIG. 2B: a projection in the image plane of the optical detection means of the first straight line.

An advantageous property of the method resides in the fact that the alignment in the image plane of the projections $P_1$, $P_2$ and $P_3$ of the points $M_1$, $M_2$ and $M_3$ is preserved.

In the example of FIG. 2B, the point $P_1$ is situated at an end of the parallelogram 1' arising from the projection of the rectangle 1 in the image plane, the point $P_2$ is situated in the middle of the parallelogram 2' arising from the projection of the rectangle 2 in the image plane and finally the point $P_3$ is situated at an end of the parallelogram 3' arising from the projection of the rectangle 3 in the image plane.

Figure 3A:
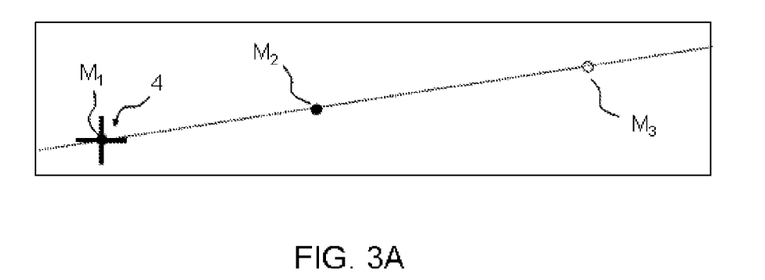
FIG. 3A: an example of a second straight line defined by three notable points of elements tied to an object.

In the example of FIG. 3A, a notable shape identifiable by a camera may be realized by means of a luminous cross or a specific colour. In this example, the notable point $M_1$ is chosen as being the centre of the luminous cross 4. This case makes it possible to identify for example the identifiable extremal point, with the aid of the geometric shape, making it possible to give the orientation of the straight line formed by the triple of notable points.

The notable points $M_1$, $M_2$ and $M_3$ are aligned and the sense of the alignment is tagged by virtue of the luminous shape 4 which characterizes the extremal point $M_1$.

Figure 3B:
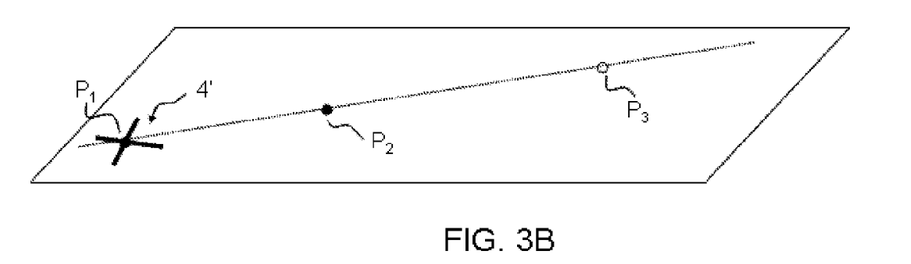
FIG. 3B: a projection in the image plane of the optical detection means of the second straight line.

In the image plane of FIG. 3B, the alignment is preserved, as is the position of $M_1$ in the identifiable geometric shape 4'.

The invention makes it possible, on the basis of a configuration of alignment of notable points, defining a straight line, said points being tied to an object moving in space, to determine the orientation of the object in space.

Figure 4:
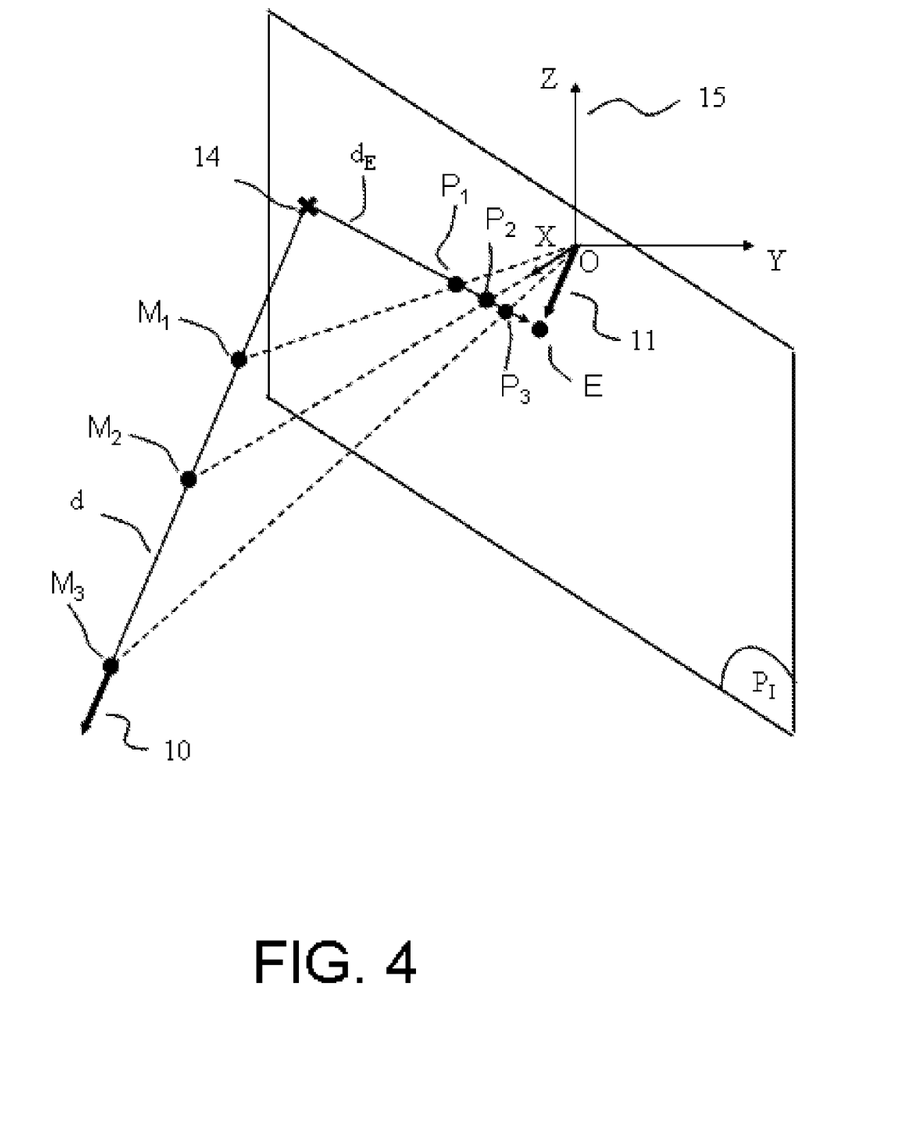
FIG. 4: an exemplary construction of the vanishing point in the image plane of the orientation of a straight line tied to an object.

FIG. 4 makes it possible to detail the method for determining the orientation of an object in space on condition that three points tied to this object are aligned and that their relative position is known.

The relative position of three points is denoted: the position in a frame of reference, not represented in FIG. 4, tied to the points.

An orthonormal reference frame 15 comprising three unit vectors X, Y and Z and an origin O is employed. In order to simplify the computations, the origin O of the reference frame is situated on the principal optical axis of the optical detection means.

The unit vector X is parallel to the optical axis of the optical detection means and the vectors Y, Z are collinear with a plane perpendicular to the optical axis.

Another embodiment is possible with the definition of another reference frame, the computations detailed in the description being similar.

The points $M_1$, $M_2$ and $M_3$ form a straight line d of which an initial position may be known.

The ratio $$K = \frac{M_2 M_3}{M_1 M_3}$$

is known by construction. Furthermore this ratio can be measured optically or mechanically at any instant provided the object is not moving. This involves a calibration step.

A sense of the straight line d can be determined for example by the vector $\overrightarrow{M_1 M_2}$.

The method according to the invention proposes three modes of computation of the orientation of the straight line d, the orientation being defined for example by a vector 10, according to the image formed in the image plane $P_I$ of the projections of the three points $M_1$, $M_2$ and $M_3$.

The choice of the image plane of the optical detection means is arbitrary provided that it is perpendicular to the optical axis; it is by definition.

Judiciously, the image plane $P_I$ can be situated at an abscissa $X_{PI}=1$ to simplify the computations.

The first case corresponds to the situation where the three projections $P_1$, $P_2$ and $P_3$ of the points $M_1$, $M_2$ and $M_3$ are merged in the image plane $P_I$. In this case the straight line d is plotted by the vector $\overrightarrow{OP_1}$.

The straight line d passes through the origin of the reference frame O.

If the points $M_1$, $M_2$ and $M_3$ are diodes and if one of the extremal diodes is tagged by a different colour such as the case represented in FIG. 1 then the orientation is determined either by the vector $\overrightarrow{OP_1}$ or by the vector $-\overrightarrow{OP_1}$ depending on the colour of the diode detected by the camera.

In the other cases the projections $P_1$, $P_2$ and $P_3$ are all distinct in the image plane $P_I$.

We put $$T = \frac{P_2 P_3}{P_1 P_3};$$

The point of intersection 14 between the straight line d and the image plane $P_I$ is also on the straight line d' of the image plane $P_I$ which comprises the three projections $P_1$, $P_2$ and $P_3$, the latter projections also being aligned in the image plane $P_I$ forming a straight line $d_E$.

In a second case if we have T=K then the straight line d is parallel to the image plane $P_1$ and it is plotted by the vector $\overrightarrow{P_1 P_2}$.

If T≠K, then the straight line d is plotted by the vector $\vec{e} = \overrightarrow{OE}$, where E is the image point belonging to the image plane $P_I$ defined by the vector:

$$\overrightarrow{P_1 E} = \frac{K}{K-T} \overrightarrow{P_1 P_2}.$$

The latter point defines the vanishing point of the straight line d. The straight line d is therefore oriented by the vector 11 with the two cases arising: $\overrightarrow{OE}$ if K>T and by $-\overrightarrow{OE}$ if K<T.

In a particular embodiment, the object for which the invention makes it possible to ascertain an orientation on the basis of a known straight line tied to the said object, can comprise a second tied straight line. It is defined on the basis of a second triple of points distinct from the first triple, the points of the second triple being mutually aligned.

A first mode, corresponding to a particular case, is realized by considering two coplanar straight lines which are not mutually parallel, both tied to the said moving object. This case corresponds to that represented in FIG. 6.

A second mode, corresponding to the general case, is realized by considering two non-coplanar straight lines, both tied to the said moving object. This case corresponds to that represented in FIG. 5.

Each of the straight lines is defined by a triple of notable points.

The two straight lines defined by each triple are named d and d' and the vectors collinear with the straight lines defined as previously are named $\vec{e}$ and $\vec{e}'$, with $\vec{e}' = \overrightarrow{OE'}$, where E' is the image point defined by a vector computed in a manner analogous to the case of FIG. 4. It is possible to define the vector plane $\pi$ defined by the pair of vectors $(\vec{e}, \vec{e}')$ In the first mode, the invention makes it possible to thus ascertain the orientation of any fixed straight line $\Delta$ parallel to the plane $\pi$ which is oriented by a direction vector $\vec{\delta} = a \cdot \vec{e} + a' \cdot \vec{e}'$, with a and a' being known and fixed constants.

The orientation of the straight line $\Delta$ is obtained by using the previous equations.

The invention also makes it possible to ascertain on the basis of two triples of points tied to the moving object, the two triples of points defining respectively two straight lines d and d' which are not parallel, the rotation and the translation of the object in space. The straight lines d and d' are not necessarily coplanar, according to the two embodiments, but are tied to the object.

By considering the same frame of reference 15 as previously and the triples of points, it may be noted that:

$M_1^0, M_2^0, M_3^0$ define the straight line d at an initial instant $t_0$;

$M'_1^0, M'_2^0, M'_3^0$ define the straight line d' at an initial instant $t_0$.

$M_1, M_2, M_3$ define the straight line d at an initial instant t;

$M'_1, M'_2, M'_3$ define the straight line d' at an initial instant t;

Naming r the rotation and t the translation performed by the moving object, we may write:

$$\overrightarrow{OM_1} = \vec{t} + r(\overrightarrow{OM_1^0});$$

$$\overrightarrow{OM_2} = \vec{t} + r(\overrightarrow{OM_2^0});$$

$$\overrightarrow{OM_3} = \vec{t} + r(\overrightarrow{OM_3^0});$$

and;

$$\overrightarrow{OM'_1} = \vec{t} + r(\overrightarrow{OM'_1^0});$$

$$\overrightarrow{OM'_2} = \vec{t} + r(\overrightarrow{OM'_2^0});$$

$$\overrightarrow{OM'_3} = \vec{t} + r(\overrightarrow{OM'_3^0});$$

Figure 5:
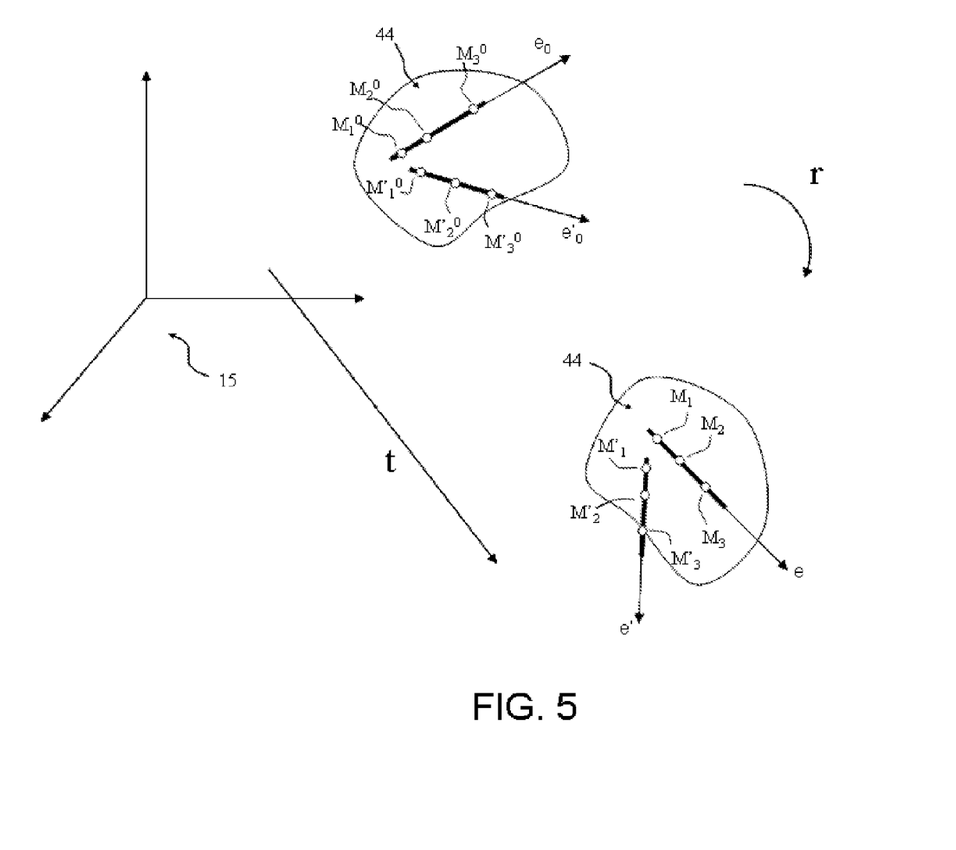
FIG. 5: a representation of an object comprising two coplanar tied straight lines defined respectively by three notable points.

FIG. 5 represents a solid 44 defining an object moving in space in a frame of reference 15 having performed a rotation r and a translation t.

The solid comprises two pairs of triples of points tied to the solid. At the instant $t_0$, these points are respectively denoted as indicated previously $(M_1^0, M_2^0, M_3^0)$ and $(M'_1{}^0, M'_2{}^0, M'_3{}^0)$, each of the triples defining a straight line, respectively d and d' plotted respectively by the vectors $\vec{e_0}$ and $\vec{e'_0}$. By construction, the matrix $[\vec{e_0}, \vec{e'_0}, \vec{u_0}]$ is known, where $\vec{u_0} = \vec{e_0} \wedge \vec{e'_0}$.

After a movement of the solid 44, the straight lines d and d' are plotted respectively by the direction vectors $\vec{e}$ and $\vec{e'}$. The vectors $\vec{e}$ and $\vec{e'}$ can be determined in the same manner as described previously in FIG. 4.

The invention makes it possible to define the rotation by the product of the following matrices:

$$r = [\vec{e}; \vec{e'}; \vec{u}] \cdot [\vec{e_0}; \vec{e'_0}; \vec{u_0}]^{-1}, \text{ or } \vec{u} = \vec{e} \wedge \vec{e'}.$$

It is noted that the matrix $[\vec{e_0}; \vec{e'_0}; \vec{u_0}]$ is indeed invertible since d and d' are not parallel, that is to say the vectors $\vec{e_0}$ and $\vec{e'_0}$ are not collinear.

Moreover, the matrix $[\vec{e_0}; \vec{e'_0}; \vec{u_0}]^{-1}$ is a fixed datum, the computation of which arises from measurements, this computation therefore being done once and for all with the accuracy that is desired.

The invention makes it possible to also compute the translation t of the solid in space. To compute the translation according to the embodiment of the invention, it is necessary to know in addition to $\vec{e_0}$ and $\vec{e'_0}$, the position of one of the points of one of the pairs of triples of notable points.

It, is possible to choose in a particular embodiment the point $M_1^0$ whose position in space at the instant $t_0$ is known.

The images on the image plane of the three points $M_1$, $M_2$ and $M_3$ of d are still denoted $P_1$, $P_2$ and $P_3$, and the images on the image plane of the three points $M'_1$, $M'_2$ and $M'_3$ of d' are still denoted $P'_1$, $P'_2$ and $P'_3$.

When $P_1 = P_2 = P_3$ and $P'_1 = P'_2 = P'_3$, the straight lines d and d' are then necessarily coplanar and secant since they are non-parallel.

Figure 6:
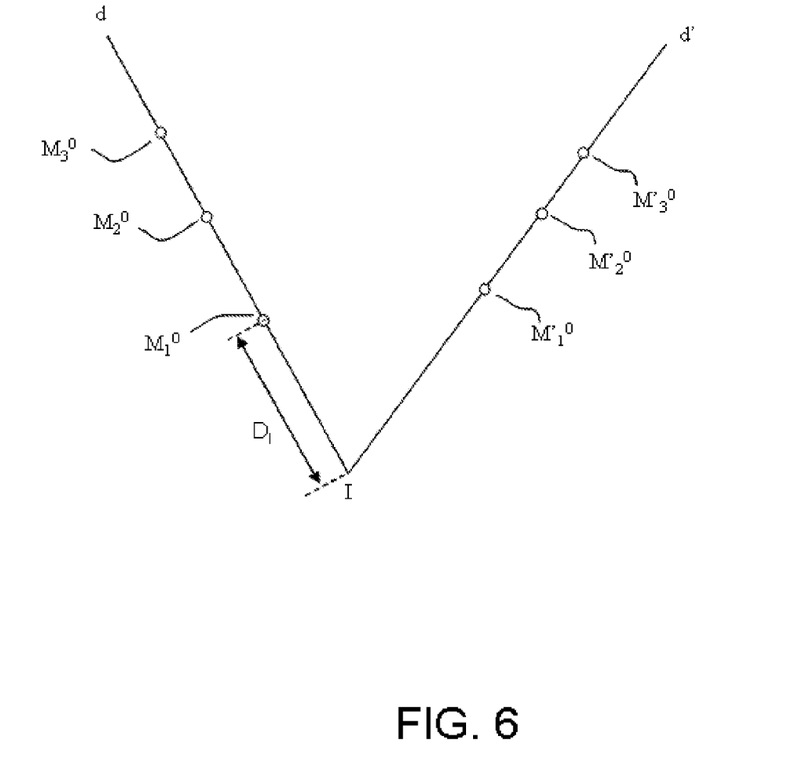
FIG. 6: a representation of the movement of an object comprising two tied straight lines defined respectively by three notable points.

FIG. 6 represents this particular case, corresponding to the first mode with d and d' secant.

The point of intersection of the straight lines d and d' is denoted I and $D_I$ denotes the distance between the point I and the point $M_1^0 \cdot D_I = IM_1^0$ The relation giving the translation t is then obtained:

$$\vec{t} = \frac{D_I}{OP_1} \overrightarrow{OP_1} - r(\overrightarrow{OM_1^0})$$

When all the points $P_1$, $P_2$ and $P_3$ or the points $P'_1$, $P'_2$ and $P'_3$ are distinct, again using the notation of the description of FIG. 4, two standard cases are distinguished.

The translation t can be written in the following manner as a function of a parameter $k_T$:

$$\vec{t} = k_T \overrightarrow{OP_1} - r(\overrightarrow{OM_1^0})$$

The first case corresponds to the case where $T \neq K$, the invention makes it possible to obtain the following relation for $k_T$:

$$k_T = \frac{T}{|K - T|} \frac{M_1 M_2}{OE}$$

The second case corresponds to the case where $T = K$, the invention makes it possible to obtain the following relation for $k_T$:

$$k_T = \frac{M_1 M_2}{P_1 P_2}.$$

The invention exhibits a first advantage of being able to compute the orientation of a solid on the basis of optical detection means such as a camera on the basis of a triple of points identifiable from the camera provided that these points are aligned and tied to the said solid.

Furthermore, the invention exhibits another advantage provided that one knows the disposition of a pair of triples of points, each of the triples of points being aligned and the two straight lines defining the triples not being parallel, it is possible on the basis of the method of the invention to compute the rotation of the solid when the latter performs a movement in space.

Finally, another advantage of the invention makes it possible, when a position in space of one of the points of the pair of triples of points is known, to compute the translation performed by the solid moving in space between two instants.

Figure 7:
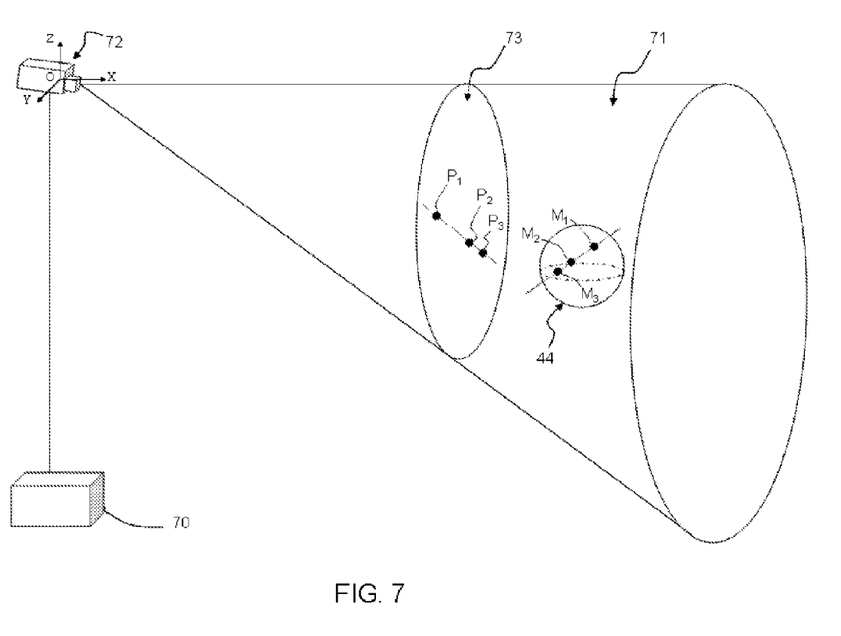
FIG. 7: a camera connected to means for computing the position of the triples of points situated on a moving object.

FIG. 7 represents a mode of realization of the detection of the orientation of an object 44 in space. The object 44 comprises three points $M_1$, $M_2$ and $M_3$ identifiable by the camera 72. One image plane 73, from among others, is represented in FIG. 7. The projections $P_1$, $P_2$ and $P_3$ of the points $M_1$, $M_2$ and $M_3$ are represented in the image plane 73 and are aligned.

One mode of the invention makes it possible to compute the orientation, the rotation and the translation of the object 44 in a portion of space 71 which corresponds substantially to the field of the camera 72, with the help of a computer 70 which computes the characteristics of the movements of the object 44 on the basis of the positions of projections $P_1$, $P_2$ and $P_3$ in the image plane. The computer can slave the line of sight of the camera to the positions of the projections in the image plane. The latter case is beneficial when the zone covered by the field of the camera comprises a weak conical ray.

This mode makes it possible to carry out tracking, that is to say a slaving, when the object performs movements of large amplitude for example.

One of the principal advantages of the invention is to place the points in a simple manner on the object, the sole constraint of the alignment of the points being necessary. This disposition of the points on the object makes it possible to obtain better accuracy in evaluating the position and attitude of the object. Furthermore this disposition makes it possible to simplify the processing computations and finally the implementation of such a solution is simplified by the sole constraint of alignment of the points on the object.

What is claimed is:

1. Optical method for detecting the orientation of an object in space, the object comprising a first triple of notable and aligned points ($M_1$, $M_2$, $M_3$) tied to the said object, whose relative positions are known, the first triple of notable and aligned points defining a first straight line (d) in space, optical detection means making it possible to determine relative positions in its image plane ($P_I$) of projection points ($P_1$, $P_2$, $P_3$) of the first triple of notable and aligned points in space, wherein a computer makes it possible, by means of the relative positions of the projection points in the image plane of the first triple of notable and aligned points, and of an identifiable characteristic of an external one point of the first triple of notable and aligned points, to determine a direction vector of the first straight line and of its orientation to mechanically slave an orientation of an optical axis of the optical detection means according to the position of the object in space, the direction vector of the first straight line being plotted by vector $\overrightarrow{OE}$, where O is center of a reference frame $R(O, \vec{u}, \vec{v}, \vec{w})$ having as origin a point belonging to the optical detection means, $\vec{u}$ being parallel to an optical axis of the optical detection means, and the planes $(\vec{v}, \vec{w})$ being parallel to the image plane (I), where E is a point of the image plane defined by the relation:

$$\overrightarrow{P_1E} = \frac{K}{K-T}\overrightarrow{P_1P_2},$$

with $P_1$, $P_2$ and $P_3$ the three projection points in the image plane of the first triple of notable and aligned points $M_1$, $M_2$, $M_3$, and $$K = \frac{M_2M_3}{M_1M_3},$$

wherein $M_2M_3$ is a distance between a second point and a third point of the first triple of notable and aligned points and $M_1M_3$ is a distance between a first point and the third point of the first triple of notable and aligned points and $$T = \frac{P_2P_3}{P_1P_3},$$

wherein $P_2P_3$ is a distance between a second projection point and a third projection point of the projection points of the first triple of notable and aligned points and $P_1P_3$ is a distance between a first projection point and a third projection point of the projection points of the first triple of notable and aligned points.

2. Optical method for detecting the orientation of a straight line in space according to claim 1, wherein the first triple of notable and aligned points are diodes, the external one point of the first triple of notable and aligned point is a diode of which has a different luminescence from the other two diodes.

3. Optical method for detecting the orientation of a straight line in space according to claim 2, wherein the external diode diffuses a light whose wavelength is different from the other two diodes.

4. Optical method for detecting the orientation of a straight line in space according to claim 2, wherein the external diode diffuses a light whose luminous intensity is different from the other two diodes.

5. Optical method for detecting the orientation of a straight line in space according to claim 1, wherein one of the first triple of notable and aligned points is situated at an end or at center of a geometric shape identifiable by the optical detection means.

6. Optical method for detecting the orientation of a straight line in space according to claim 5, wherein each of the first triple of notable and aligned points is situated at an end or at a center of an identifiable geometric shape whose shapes are solid, and for which the identifiable characteristic of an external point is that the shape with which each of the first triple of notable and aligned points is associated is of a different color from the other two shapes.

7. Optical method for detecting the orientation of a straight line in space according to claim 6, wherein the identifiable geometric shapes are rectangles.

8. Optical method for detecting the orientation of a straight line in space according to claim 5, wherein the external point comprising an identifiable characteristic is at a center of a cross identifiable by the optical detection means.

9. Optical method for detecting the orientation of a straight line in space according to claim 5, wherein the optical detection means are a camera.

10. Optical method for detecting the orientation and rotation of an object in space according to claim 1, the object comprising a second triple of notable and aligned points tied to the said object, whose relative positions are known, the second triple of notable and aligned points defining a second straight line in space not parallel to the first straight line, the optical detection means making it possible to determine the relative positions in its image plane (PI) of projection points of the second triple of notable and aligned points in space, wherein the computer makes it possible, by means of the relative positions of the projection points in the image plane of the second triple of notable and aligned points, and of an identifiable characteristic of an external point of the second triple of notable and aligned points, to determine the characteristic of the rotation of the said object.

11. Optical method for detecting the orientation and rotation of an object in space according to claim 10, wherein the rotation r of the object is defined by the matrix relation:

$$r = [\vec{e}; \vec{e'}; \vec{u}] \cdot [\vec{e_0}; \vec{e'_0}; \vec{u_0}]^{-1}, \text{ or } \vec{u} = \vec{e} \wedge \vec{e'},$$

with:
$e_0$ and $e_0'$: the vectors defining, at an instant $t_0$, the direction of each of the straight lines d and d', and;
e and e': the vectors defining, at an instant t, the direction of each of the straight lines d and d';
E' is the point of the image plane defined by the relation:

$$\overrightarrow{P_1'E'} = \frac{K}{K-T}\overrightarrow{P_1'P_2'},$$

with $P_1'$, $P_2'$ and $P_3'$ the three projections in the image plane of the points $M_1'$, $M_2'$, $M_3'$, and $$K = \frac{M_2'M_3'}{M_1'M_3'},$$

wherein $M'_2M'_3$ is a distance between a second point and a third point of the second triple of notable and aligned points and $M'_1M'_3$ is a distance between a first point and the third point of the second triple of notable and aligned points and $$T = \frac{P_2'P_3'}{P_1'P_3'},$$

wherein $P'_2P'_3$ is a distance between a second projection point and a third projection point of the projection points of the second triple of notable and aligned points and $P'_1P'_3$ is a distance between a first projection point and a third projection point of the projection points of the second triple of notable and aligned points.

12. Optical method for detecting the orientation and rotation of an object in space according to claim 11, wherein a parameter $k_T$ makes it possible at each instant to define the translation t of the object, the translation t being expressed thus: $\vec{t} = k_T \overrightarrow{OP_1} - r(\overrightarrow{OM_1^0})$, where $M_1^0$ is a known position of the point M1 at a given instant.

13. Optical method for detecting the orientation and rotation of an object in space according to claim 12, wherein the parameter $k_T$ satisfies the equality:

$$k_T = \frac{T}{|K-T|} \frac{M_1 M_2}{OE}.$$

14. Optical device for detecting the orientation and rotation of an object in space implementing the method according to claim 13, comprising a camera, a computer and means of signaling comprising the definition of two pairs of triples of notable points, wherein the computer, computing the rotation and the translation of the object in space.

* * * * *